Patented May 1, 1951

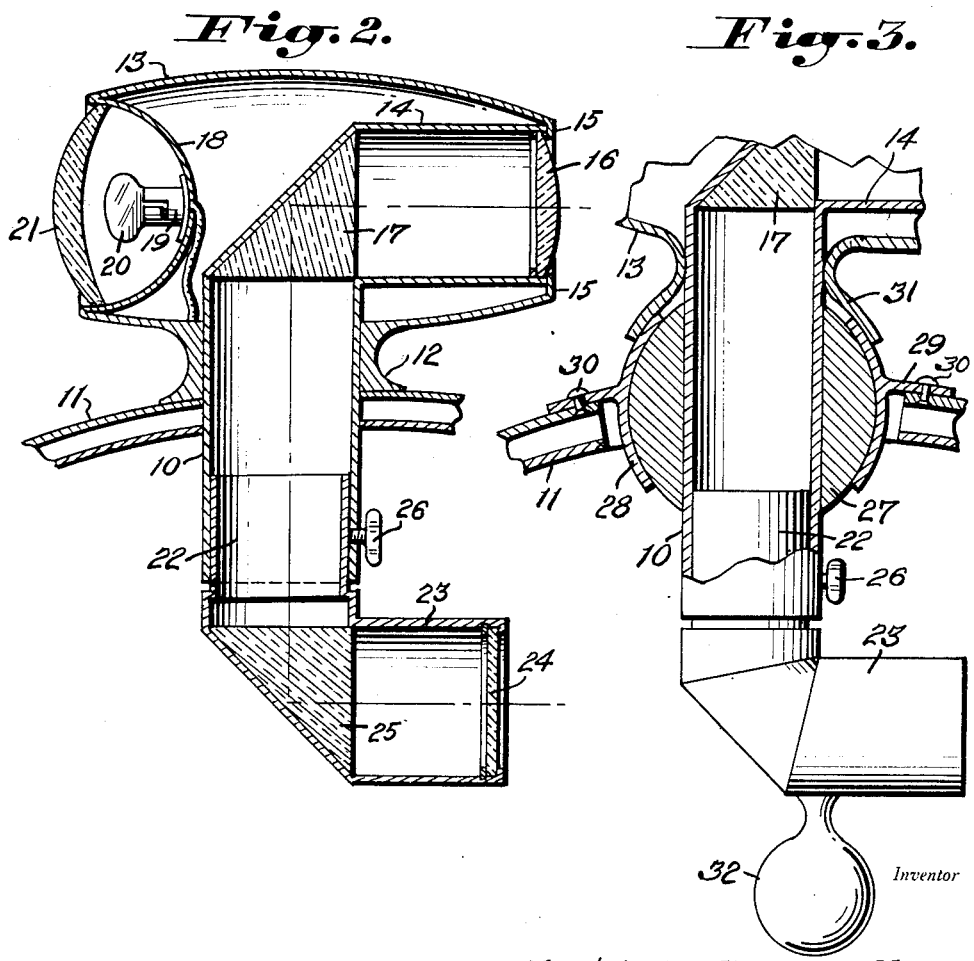

2,551,243

UNITED STATES PATENT OFFICE 2,551,243

VEHICLE PERISCOPE

Archie D. Campbell, Whiting, Ind.

Application October 25, 1948, Serial No. 56,273

1 Claim. (Cl. 88—70)

The present invention relates to a vehicle periscope and it consists in the combinations, constructions and arrangements of parts herein described and claimed.

It is an object of the present invention to provide a combination spot light and rear vision periscope for vehicles.

Another object of the invention is to provide a device of the character set forth having an eye-piece vertically adjustable to the eyes of the operator of the vehicle.

Another object of the invention is the provision, in a device of the character set forth, of a novel weather-proof swivel mounting for the same.

A further object of the invention is the provision of a device of the character set forth which is simple in construction and operation and yet effective and efficient in use.

Other and further objects of the invention will become apparent from a reading of the following specification taken in conjunction with the drawing, in which:

Figure 1 is a fragmentary side elevational view of a vehicle with an embodiment of the present invention mounted thereon, Figure 2 is a vertical sectional view illustrating one form the invention may assume, and Figure 3 is a fragmentary vertical sectional view illustrating a modified form of the invention.

Generally, there is provided a periscope adapted to be either fixedly or swively mounted in the roof of a vehicle and having its upper end positioned in the rear portion of a lamp housing. The lower end of the periscope is telescopically connected with the upper end in order that the eye-piece may be raised and lowered to suit the operator of the vehicle.

Referring more particularly to the drawing, there is shown therein in Figure 2, a periscope having an upper vertically extending tube 10 which extends through the roof 11 of a vehicle and a base 12 of a lamp housing 13 and which has a horizontally and rearwardly extending portion 14 within the lamp housing and whose rear end abuts the inner edges 15 of an opening in the rear of the lamp housing.

A lens 16 is mounted in the rear end of the portion 14 and a prism 17 is affixed in the tube 10 and its horizontal portion 14 at their juncture. The forward end of the housing 13 is provided with a reflector 18 having a lamp socket 19 mounted thereon and in which is positioned a lamp 20. A lens 21 is provided for the lamp.

Slidably and revolubly mounted within the tube 10 is a lower tube 22 having an integrally formed horizontally extending tubular portion 23 in the outer end of which is mounted a ground glass viewing plate 24. A prism 25 is affixed within the tube 22 and its horizontal portion at their juncture.

The tube 10 has horizontally threaded therein at a point adjacent the lower end thereof a thumb screw 26.

In operation, it will be apparent that the device may be mounted in the roof of a vehicle at a point above the operator's position therein and in such manner that the viewing screen 24 may be conveniently examined by the operator in the same manner as the conventional rear view mirror. However, since the lens 16 is above all obstructions within and upon the vehicle, a clear view of the road to the rear of the vehicle together with its attendant traffic may be had by the operator at all times. The operator may raise and lower and adjust to right or left the position of the screen 24 with respect to his eyes by loosening the screw 26 and manipulating the lower portion of the periscope to his satisfaction and then tightening the screw to lock the parts of the periscope in such adjusted position.

In the form of the invention shown in Figure 3, wherein similar parts already described with respect to Figure 2 are given identical reference characters, the periscope therein shown extends through a ball-shaped bearing 27 which snugly fits within a curvular bearing housing 28 having a flange 29 affixed to the roof 11 by rivets 30 or the like. The lower end of the lamp housing 13 in this case is provided with a dependent flared portion 31 which overlaps the upper side of the bearing housing 28.

The horizontal portion 23 is provided with a dependent operating handle 32.

In the operation of this form of the invention, after the periscope has been vertically adjusted by means of the screw 26, rays from the lamp 20 may be directed by moving the handle 32 and likewise the view received upon the screen 24 may be adjusted by the same means when it is desired to use the periscope as such.

While but two forms of the invention have been shown and described herein, it will be readily apparent to those skilled in the art that many minor modifications may be made without departing from the spirit of the invention or the scope of the appended claim.

What is claimed is:

The combination of a vehicle having a roof and a periscope having a tubular body extending through said roof and having universal connection therewith and a housing for the upper end of the periscope, said universal connection comprising a ball having an opening therethrough for the reception of the tubular body, a curvular bearing partially encompassing said ball, a flange outwardly extending from the bearing and affixed to the upper side of the roof and a dependent flared portion for the periscope housing overlapping in close alignment the upper end of the bearing.

ARCHIE D. CAMPBELL.

REFERENCES CITED

The following references are of record in the file of this patent:

UNITED STATES PATENTS

| Number | Name | Date |
|---|---|---|
| 1,161,995 | Styll | Nov. 30, 1915 |
| 1,301,502 | Robertson | Apr. 22, 1919 |
| 1,635,011 | Sadler | July 5, 1927 |
| 1,828,924 | Chardell et al. | Oct. 27, 1931 |
| 2,281,102 | Lowman | Apr. 18, 1942 |
| 2,325,253 | Loging | July 27, 1943 |

FOREIGN PATENTS

| Number | Country | Date |
|---|---|---|
| 458,196 | Germany | Mar. 31, 1928 |
| 667,340 | Germany | Nov. 9, 1938 |